(12) United States Patent
Takegami

(10) Patent No.: US 8,501,065 B2
(45) Date of Patent: Aug. 6, 2013

(54) FILM AND METHOD FOR PRODUCING FILM

(75) Inventor: Ryuta Takegami, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 175 days.

(21) Appl. No.: 13/122,090

(22) PCT Filed: Oct. 1, 2009

(86) PCT No.: PCT/JP2009/067523
§ 371 (c)(1),
(2), (4) Date: Mar. 31, 2011

(87) PCT Pub. No.: WO2010/038907
PCT Pub. Date: Apr. 8, 2010

(65) Prior Publication Data
US 2011/0177289 A1    Jul. 21, 2011

(30) Foreign Application Priority Data
Oct. 1, 2008   (JP) ................................ 2008-256559

(51) Int. Cl.
*B29C 67/20* (2006.01)
*B28B 3/20* (2006.01)
*D01D 5/12* (2006.01)
*C09K 19/00* (2006.01)
*G02B 5/30* (2006.01)
*C08G 63/00* (2006.01)

(52) U.S. Cl.
USPC ....... 264/210.1; 264/1.1; 264/1.31; 264/1.34; 264/1.6; 264/175; 264/176.1; 264/210.2; 264/211.12; 264/319; 264/330; 264/331.11

(58) Field of Classification Search
USPC ........... 264/175, 176.1, 210.1, 210.2, 211.12, 264/1.1, 1.31, 1.34, 1.6, 1.7, 2.7, 210.7, 319, 264/330, 331.11; 528/308.2; 359/483.01; 428/1.31
See application file for complete search history.

(56) References Cited

U.S. PATENT DOCUMENTS

| | | | | |
|---|---|---|---|---|
| 6,306,327 | B1* | 10/2001 | Fujii et al. | 264/210.2 |
| 6,756,002 | B2* | 6/2004 | Fujii et al. | 264/210.2 |
| 6,943,229 | B2* | 9/2005 | Funaki et al. | 526/351 |
| 2003/0175539 | A1 | 9/2003 | Matsuzaka et al. | |

FOREIGN PATENT DOCUMENTS

| | | |
|---|---|---|
| JP | 02-047031 A | 2/1990 |
| JP | 06-335966 A | 12/1994 |
| JP | 09-155951 A | 6/1997 |
| JP | 2003-25414 A | 1/2001 |

(Continued)

OTHER PUBLICATIONS

Journal of Seikei-Kakou, vol. 19, No. 8 (2007).

(Continued)

*Primary Examiner* — Christina Johnson
*Assistant Examiner* — Atul P. Khare
(74) *Attorney, Agent, or Firm* — Sughrue Mion, PLLC

(57) ABSTRACT

A method for producing a film comprising feeding a composition comprising a crystalline thermoplastic resin having a temperature of higher than the crystallization temperature Tc of the resin to between a first nip-pressing surface and a second nip-pressing surface of a nip-pressing unit, and leading the composition to pass through the nip-pressing surfaces while the nip-pressing unit gives a pressure of from 5 to 1000 MPa to the composition, to thereby form the composition into a film continuously.

18 Claims, 3 Drawing Sheets

(56) References Cited

FOREIGN PATENT DOCUMENTS

| | | |
|---|---|---|
| JP | 3194904 B2 | 8/2001 |
| JP | 2001-347565 A | 12/2001 |
| JP | 2002-173541 A | 6/2002 |
| JP | 2002-292665 A | 10/2002 |
| JP | 2002-347109 A | 12/2002 |
| JP | 2005-193643 A | 7/2005 |
| JP | 2007-002216 A | 1/2007 |
| JP | 3873334 B2 | 1/2007 |
| JP | 2007038646 A * | 2/2007 |
| JP | 2008-044336 A | 2/2008 |
| JP | 2008-095085 A | 4/2008 |
| WO | 02/22343 A1 | 3/2002 |
| WO | WO 2007123145 A1 * | 11/2007 |
| WO | WO 2008010361 A1 * | 1/2008 |

OTHER PUBLICATIONS

International Preliminary Report on Patentability dated Apr. 14, 2011 for PCT/JP2009/067523.

Office Action dated Apr. 23, 2013 in Japanese Application No. 2009-226433.

* cited by examiner

FILM AND METHOD FOR PRODUCING FILM

CROSS REFERENCE TO RELATED APPLICATION

This application is a National Stage of International Application No. PCT/2009/067523 filed Oct. 1, 2009, claiming priority based on Japanese Patent Application No. 2008-256559, filed Oct. 1, 2008, the contents of all of which are incorporated herein by reference in their entirety.

TECHNICAL FIELD

The present invention relates to a method for producing a film, and to a film produced according to the production method. More precisely, the invention relates to a readily-formable film comprising a crystalline thermoplastic resin, and to a simple and inexpensive production method for it.

BACKGROUND ART

Regarding a film comprising a crystalline thermoplastic resin, an easily-formable polyester film such as typically those in Patent References 1 to 3 and Non-Patent Reference 1 is used in various fields of wrapping materials, electronic/electric parts forming materials, automobile parts forming materials, surface forming materials for large-sized shaped members and others, and is specifically noted in those fields because of its excellent low-temperature/high-temperature formability, heat resistance, chemical resistance, etc.

As a method for producing a film by the use of such a crystalline thermoplastic resin having excellent formability, for example, Patent Reference 2 and Non-Patent Reference 1 disclose a production method comprising an essential step of preheating an unstretched film at a predetermined temperature for a predetermined period of time followed by a subsequent biaxial stretching step. However, the method comprises three steps of a preheating step before stretching, a longitudinal stretching step and a lateral stretching step, and therefore requires planning a complicated process, and in addition, the facilities cost for producing a special longitudinal stretcher is high. Therefore, it is desired to improve the method in point of the cost and the simplicity thereof. In case where the easily-formable polyester film produced according to the references is laminated on a metal plate, it requires adhesiveness between the metal plate and the film, and therefore it is also desired to further improve the property of the film itself. Patent Reference 3 discloses a method for producing an easily-formable polyester film that may be adhered to a metal plate under thermal pressure though having a high degree of crystallinity, in which is used a copolyester resin of PET and PBT. The production method in the reference requires an indispensable step of previously mixing and pre-kneading a specific phosphorus compound with the PET resin and controlling the interesterification by the action of the phosphorus compound serving as a catalyst for the purpose of severely controlling the copolymerization ratio of the copolyester resin, and further requires an additional indispensable step of melting the phosphorus-containing PET resin pellets and PBT resin pellets in an extruder after controlling their size to fall within a specific range. Accordingly, the process itself is complicated and, in addition, the technique of producing the resins is also complicated, and the cost of the resin materials is high. For these reasons, it is still desired to develop the method in point of the cost and the simplicity thereof.

On the other hand, various film production methods have been developed. For example, Patent Reference 4 discloses a film production apparatus for touch roll film formation from a PET resin melt between two metal rolls. The reference suggests a film-finishing technique of smoothing both surfaces of the formed film in some degree by nip-pressing both the surface and the back of the film between the metal surfaces of the rolls. However, regarding the special effect in using the production apparatus for PET resin, the reference discloses only the fact that, since the film can be rapidly cooled by the use of the touch rolls each having a thin-wall metal sheath, the produced film could attain the transparency on the same level as that of ordinary PET films. Specifically, in the reference, there is made neither investigation nor discussion relating to the formability of the produced film and even relating to the relationship between the nip-pressing pressure and the film formability. Accordingly, the reference makes neither suggestion nor disclosure of an efficient production method for a crystalline thermoplastic resin having excellent film formability.

Patent Reference 1: Japanese Patent No. 3873334
Patent Reference 2: JP-A 2002-347109
Patent Reference 3: JP-A 2002-173541
Patent Reference 4: Japanese Patent No. 3194904
Non-Patent Reference 1: Journal of Seikei-Kakou, Vol. 19, No. 8 (2007)

As in the above, heretofore no one knows a simple and inexpensive production method for producing a crystalline thermoplastic film that has good adhesiveness to a metal plate and is excellent in formability and strength.

SUMMARY OF THE INVENTION

A first object of the present invention is to provide an inexpensive and simple production method for producing a film that has good adhesiveness to a metal plate and is excellent in formability and strength. A second object of the invention is to provide a film produced according to the production method, which has good adhesiveness to a metal plate and is excellent in formability and strength.

In order to solve the above-mentioned problems, the present inventors have studied and investigated film production methods of using a nip-pressing apparatus for film formation from a crystalline thermoplastic resin-containing composition under high pressure, and as a result, have found a simple and inexpensive production method for an easily-formable film excellent in the elongation at break and in the yield stress thereof, not requiring any specific step. Specifically, according to the production method of the invention, it has been clarified that the above-mentioned easily-formable film can be produced with the same cost as that in producing conventional unstretched PET films, and the producibility on that level could not heretofore been attained. The film production method of the invention does not require any additional pre-heating step, longitudinal stretching step and lateral stretching step after film formation, like those in the production method in Patent Reference 2, and therefore, the producibility in the production method of the invention is excellent in point of both the cost side and the film production simplicity. Moreover, the production method of the invention does not require phosphorus compound addition, pre-kneading and pellet size control like in the production method in Patent Reference 3, and therefore, the producibility in the production method of the invention is excellent in point of both the cost side and the film production simplicity.

Further, the present inventors have found that the film produced according to the production method of the invention is a double-mirror-surface film, and its adhesiveness to a metal plate is improved.

The inventors have found that the film production method and the film produced according to the method mentioned below can solve the above-mentioned problems, and have completed the present invention described below.

[1] A method for producing a film comprising:

feeding a composition comprising a crystalline thermoplastic resin having a temperature of higher than the crystallization temperature (hereinafter this may be referred to as Tc) of the resin to between a first nip-pressing surface and a second nip-pressing surface of a nip-pressing unit, and leading the composition to pass through the nip-pressing surfaces while the nip-pressing unit gives a pressure of from 5 to 1000 MPa to the composition, to thereby form the composition into a film continuously.

[2] The method for producing a film according to [1], wherein the crystalline thermoplastic resin is a polyester.

[3] The method for producing a film according to [1] or [2], wherein the composition to be led to pass through the nip-pressing surfaces is melt-extruded from a die.

[4] The method for producing a film according to any one of [1] to [3], wherein the moving speed of the first nip-pressing surface of the nip-pressing unit is higher than the moving speed of the second nip-pressing surface thereof, and the ratio of the moving speed of the second nip-pressing surface to that of the first nip-pressing surface in the nip-pressing unit, as defined according to the following formula (I), is from 0.600 to 0.999:

Moving speed ratio=(speed of second nip-pressing surface)/(speed of first nip-pressing surface)  (I).

[5] The method for producing a film according to any one of [1] to [4], wherein the nip-pressing unit comprises two rolls.

[6] The method for producing a film according to any one of [1] to [5], wherein the first nip-pressing surface and the second nip-pressing surface have a temperature of lower than the crystallization temperature Tc of the crystalline thermoplastic resin.

[7] The method for producing a film according to any one of [1] to [6], which comprises stretching the film in the width direction thereof.

[8] A film produced by the method of any one of [1] to [7].

[9] A film comprising a crystalline thermoplastic resin in an amount of at least 60% by mass wherein composition is uniform in the plane and in the thickness direction of the film, both sides of the film have a mirror surface, and the film has an elongation at break at 25° C. of at least 150% and a yield stress of at least 40 MPa.

[10] The film according to [9], wherein orientation degree is continuously changed in the thickness direction of the film and a part having a maximum orientation degree is inside the film.

[11] The film according to any one of [8] to [10], having a thickness fluctuation of at most 3%.

[12] The film according to any one of [8] to [11], wherein the crystalline thermoplastic resin is a polyester.

[13] The film according to [12], wherein the polyester is polyethylene terephthalate or polyethylene naphthalate.

[14] The film according to any one of [8] to [13], which has a polarization property.

According to the invention, there are provided a film having good adhesiveness to a metal plate and excellent in formability and strength, and an inexpensive and simple production method for the film. Since the film of the invention has good adhesiveness to a metal plate, it is favorably used, for example, for laminate films.

In a more preferred embodiment of the film production method of the invention, the moving speed between the first nip-pressing surface and the second nip-pressing surface of the nip-pressing unit used is controlled and a shearing force is given to the film running between the two, whereby the film orientation can be further promoted to give a film having a high mechanical strength and keeping easy formability. In a preferred embodiment of the film of the invention, its adhesiveness to a metal is improved since the thickness fluctuation is small and the film has a special inner structure in the thickness direction thereof. Further, stretching the film of the invention in the lateral direction thereof makes the film have a polarization property. The film having a polarization property is applicable to various fields as optical films. For example, it may be stuck to a polarizing element to give a polarizer; and the polarizer may be incorporated in a liquid-crystal display device to make the device have an excellent viewing angle compensation capability.

Figure 1:
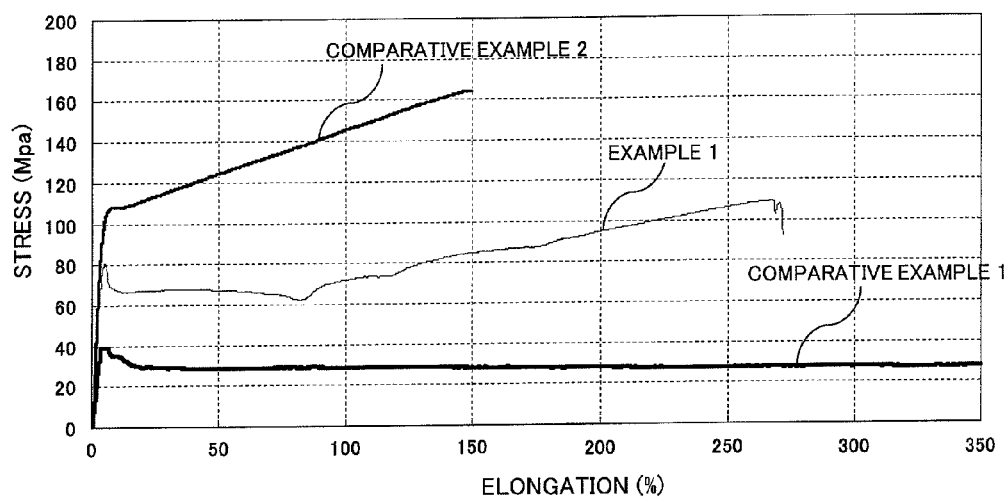
FIG. 1 is a graph showing a relationship between the elongation and the stress of films of Example 1 (thin line), Comparative Example 1 (thick line) and Comparative Example 2 (middle-thick line).
Figure 2:
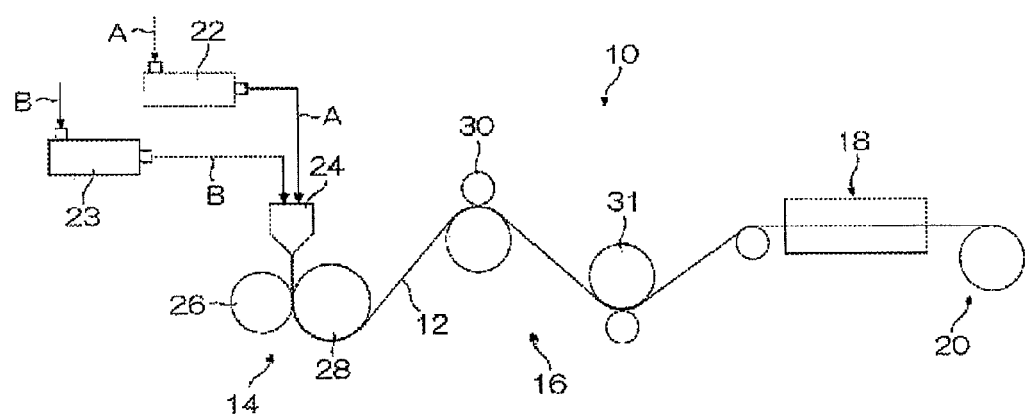
FIG. 2 is a constitutional view of a film production apparatus to which the invention is applicable.

In the drawings, 10 is a film production apparatus; 12 is a crystalline thermoplastic resin film; 14 is a film forming zone; 16 is a longitudinal stretching zone; 18 is a lateral stretching zone; 20 is a winding zone; 22 and 23 are extruders; 24 is a die; 24a is a single-layer die; 25 is a feed block; 26 is a touch roll; 28 is a chill roll; 70, 72, 74 ad 78 are flow passes; 76 is a junction; 80 is a manifold; 82 is a slit; 84 is a melt discharge port; 85 is a resistor; 86, 88 and 90 are manifolds; 92 is a junction; 94 is a slit; 96 is a melt discharge port; A and B are crystalline thermoplastic resin-containing compositions; M is a lip land length; S is an overall film width (inner layer width); T is an outer layer width.

MODES FOR CARRYING OUT THE INVENTION

The invention is described in more detail hereinunder. In this description, the numerical range expressed by the wording "a number to another number" means the range that falls between the former number indicating the lowermost limit of the range and the latter number indicating the uppermost limit thereof. In this description, the "film lengthwise direction" means MD (machine direction); and the film width direction means a direction perpendicular to MD.

[Film]

The film of the invention comprises a crystalline thermoplastic resin in an amount of at least 60% by mass, its composition is uniform in the plane and in the thickness direction of the film, its both surfaces are mirror-finished, its elongation at break at 25° C. is at least 150%, and its yield stress is at least 40 MPa. The film of the invention preferably has a special inner structure and has a thickness fluctuation of at most 3%.

The characteristic features of the film of the invention are described in detail hereinunder.

(Elongation at Break)

The film of the invention has an elongation at break at 25° C. of at least 150% in MD of the film; and having the elongation at break on the level, the film secures good formability. Preferably, the elongation at break at 25° C. of the film is from 150 to 600%, more preferably from 150 to 400%, still more preferabhly from 200 to 400%.

Preferably, the elongation at break at 25° C. of the film of the invention satisfies the above-mentioned range both in MD of the film and in the direction perpendicular to MD, from the viewpoint of the formability of the film. More preferably, the total of the elongation at break at 25° C. of the film in MD and the elongation at break thereof in the direction perpendicular to MD is from 300 to 2000% from the viewpoint of the formability of the film, even more preferably from 300 to 1700%, still more preferably from 300 to 1400%.

Preferably, the absolute value of the difference between the elongation at break at 25° C. of the film of the invention in MD and the elongation at break thereof in the direction perpendicular to MD is from 0 to 500% so as to make the film have uniform and good formability and workability in every direction, more preferably from 0 to 400%, even more preferably from 0 to 300%.

(Stress)

The film of the invention has a yield stress of at least 40 MPa, and the film of the type has good formability. Preferably, the yield stress is from 40 to 110 MPa, more preferably from 50 to 100 MPa.

Preferably, the film of the invention has a stress at break of at least 60 MPa, from the viewpoint of satisfying well-balanced formability and strength. More preferably, the stress at break of the film is from 60 to 140 MPa, even more preferably from 60 to 120 MPa.

Preferably, the film of the invention has a stress in 100% elongation at 25° C. of from 40 to 110 MPa, from the viewpoint of expressing good formability, more preferably from 50 to 100 MPa.

(Film Surface)

Both surfaces of the film of the invention are mirror-finished, and therefore the film has good adhesiveness. Conventional readily-formable films could not attain such a double-mirror-surface film, which is one characteristic feature of the invention. In this description, "mirror surface" means that the surface roughness Ra of the film surface is at most 50 nm. The surface roughness Ra of the film is preferably at most 40 nm, more preferably at most 30 nm, most preferably at most 15 nm. The "mirror surface" of the film is not correlated with a metallic gloss which the film surface may have or not. The film surface roughness Ra may be determined by analyzing both surfaces of the film with a non-contact three-dimensional structure-analyzing microscope (Zygo's New View 6000 Model), in the field of view of 10 cm×10 cm in a switching mode.

(Inner Structure of the Film)

The film of the invention has different orientation degrees in the thickness direction although it consists of a sole composition. The film of the invention preferably has a part having the maximum orientation degree in its inside. Since the film of the invention is produced by passing between a first nip-pressing surface and a second nip-pressing surface, the resin composition is formed into a film while substantially cooling the both surfaces of the resin composition having a temperature of higher than Tc. The surfaces are cooled rapidly and the produced film has surfaces with almost no orientation. Inside of the composition is subjected to compression and elongation deformation while cooled slowly and therefore is easy to orient. The film of the invention is considered to have an intermediate mechanical property between the mechanical property of a non-oriented film described above and a mechanical property of an oriented film.

JP-A 2007-76026 and JP-A 2007-203571 disclose a laminate of a non-oriented film and an oriented film. These films often have problems of separation of the layers and thickness fluctuation. The film disclosed in Japanese Patent No. 3194904 also has a significant thickness fluctuation due to the complicated stretching process in the longitudinal direction. In a preferred embodiment of the film of the invention, the orientation is changed continuously and separation of layers is hardly happen.

In the invention, the orientation of a film is measured by the following process:

(1) A sliced sample containing the thickness direction of the film in its plane is prepared with a microtome (Leica's RM2265) or others.

(2) Orientation degree in the thickness direction is determined by observing the sliced sample in a polarization microscope (Nikon Corporation's Eclipse E600POL) in which two polarizers are set under crossed Nicols and measuring birefringence.

(Thickness Fluctuation)

In a preferred embodiment of the film of the invention, thickness fluctuation of the film can be controlled to at most 3%. Such films are particularly excellent in adhesiveness between the film and a metal plate.

The film of the invention preferably has a thickness fluctuation of at most 3% from the view point of expressing good adhesiveness and handlability. The thickness fluctuation is more preferably at most 2%, still more preferably at most 1%, particularly preferably at most 0.5%.

The thickness fluctuation is determined by measuring thickness of a sample film along MD and TD continuously, and obtaining the thickness fluctuation by the following formula:

$$[(T_a - T_b)/T_{ave}] \times 100$$

wherein $T_a$ is the maximum thickness, $T_b$ is the minimum thickness and $T_{ave}$ is an average of the measured thickness.

(Tensile Modulus)

Preferably, the film of the invention has a tensile modulus of from 1000 to 3000 MPa from the viewpoint of expressing good formability, more preferably from 1500 to 3000 MPa.

(Film Thickness)

The thickness of the film of the invention is preferably at most 200 μm from the viewpoint of sticking the film to a metal plate, more preferably at most 100 μm, even more preferably at most 50 μm. In case where the film of the invention is used in liquid-crystal displays and the like, its thickness is preferably at most 100 μm from the viewpoint of reducing the thickness of the devices, more preferably at most 80 μm, even more preferably at most 60 μm. According to the film production method of the invention, such a thin film can be produced not requiring a stretching step, and this is one characteristic difference between the invention and the related prior art.

(Polarization Property)

A more preferred embodiment of the film of the invention may be a film having a polarization property. The film having a polarization property is favorable from the viewpoint that the film is applicable to polarizers or liquid-crystal display devices as a retardation film, and to other various optical films.

(Crystalline Thermoplastic Resin)

The film of the invention comprises a crystalline thermoplastic resin in an amount of at least 60% by mass of the entire film.

Not specifically defined, the crystalline thermoplastic resin includes polyolefins such as polyethylene, polypropylene, etc.; crystalline polystyrenes such as syndiotactic polystyrene, isotactic polystyrene, etc.; polyesters such as polyethylene terephthalate (PET), polyethylene naphthalate (PEN), polybutylene terephthalate (PBT), etc.; polyarylates, polyacetals, polyamides, polysulfones, polyether ether ketones, polyether ketones, polyphenylene sulfide; nylons such as nylon-6, nylon-66, nylon-12, etc.; polylactic acid; aliphatic polyesters such as polybutylene succinate, polybutylene succinate adipate, polyethylene succinate, polycaprolactone, etc.; copolymers of terephthalic acid/1,4-butanediol/adipic acid, etc.

In case where the film of the invention is produced according to a melt extrusion method, preferably used are materials having good melt extrusion formability. Preferably, the crystalline thermoplastic resin for the film of the invention comprises a polyester as the main ingredient thereof; and more preferably, the crystalline thermoplastic resin is a polyester.

The polyester for use in the invention includes a polymer comprising a dicarboxylic acid component and a glycol component. The dicarboxylic acid component includes, for example, aromatic dicarboxylic acids such as terephthalic acid, isophthalic acid, naphthalenedicarboxylic acid, diphenyldicarboxylic acid, diphenylsulfonedicarboxylic acid, diphenoxyethanedicarboxylic acid, 5-sodium sulfoisophthalate, phthalic acid, etc.; aliphatic dicarboxylic acids such as oxalic acid, succinic acid, adipic acid, sebasic acid, dimer acid, maleic acid, fumaric acid, etc.; alicyclic dicarboxylic acids such as cyclohexanedicarboxylic acid, etc.; hydroxycarboxylic acids such as p-hydroxybenzoic acid, etc. Of those dicarboxylic acid components, preferred are terephthalic acid and isophthalic acid in view of the heat resistance and formability of the film to be produced. On the other hand, the glycol component includes, for example, aliphatic glycols such as ethylene glycol, propanediol, butanediol, pentanediol, hexanediol, neopentyl glycol, etc.; alicyclic glycols such as cyclohexanedimethanol, etc.; aromatic glycols such as bisphenol A, bisphenol S, etc. Of those glycol components, preferred is ethylene glycol. Two or more different types of these dicarboxylic acid components and glycol components may be used as combined.

Not detracting from the effect of the invention, the polymer may be copolymerized with a polyfunctional compound such as trimellitic acid, trimesic acid, trimethylolpropane, etc.

Preferred polyesters for use in the invention include, for example, PET, PEN, PBT and their copolymers with any other resin. Of those, more preferred are PET, PEN and PBT; and even more preferred are PET and PEN from the viewpoint of the cost of the materials for them and the popularity thereof.

The copolymers include, for example, copolymers of PET and PBT. The copolymers may be random copolymers or block copolymers, so far as they do not lose crystallinity. The copolymerizing component may be crystalline or non-crystalline, for which, for example, preferred are the resins mentioned hereinabove as examples of the crystalline thermoplastic resin for the film of the invention.

The mass-average degree of polymerization and the number-average molecular weight of the polyesters are not specifically defined. For example, preferred are polyesters having a mass-average degree of polymerization of from 50000 to 300000 from the viewpoint of enhancing the formability of the obtained film.

The degree of crystallinity of the polyesters is not specifically defined so far as they have a high crystallinity in some degree. So-called amorphous polyesters (for example, A-PET, etc.) are also favorably usable in the invention.

The polyesters for use in the invention may be commercial products or may be synthesized ones.

For producing the polyesters, employable are any known conventional methods with no specific limitation. For example, a case of adding germanium dioxide as a germanium compound to polyethylene terephthalate is described. A terephthalic acid component and an isophthalic acid component are reacted with ethylene glycol through interesterification or esterification, then germanium dioxide and a phosphorus compound are added thereto, and they are further reacted for polycondensation at high temperature and under reduced pressure until the product could have a predetermined diethylene glycol content, thereby giving a germanium element-containing polymer. Next, the resulting polymer is processed for solid-phase polymerization at a temperature not higher than the melting point of the polymer and under reduced pressure or in an inert gas atmosphere to reduce the acetaldehyde content in the product thereby making the product have a predetermined intrinsic viscosity and a carboxyl terminal group. This is one example of a method for producing the polyesters for use in the invention.

In producing the polyesters for use in the invention, usable are conventional known reaction catalysts and discoloration inhibitors. The reaction catalysts include, for example, alkali metal compounds, alkaline earth metal compounds, zinc compounds, lead compounds, manganese compounds, cobalt compounds, aluminium compounds, antimony compounds, titanium compounds, etc.; and the discoloration inhibitors include, for example, phosphorus compounds, etc.

Preferably, a polyester accounts for at least 60% by mass of the crystalline thermoplastic resin constituting the film of the invention, more preferably from 60 to 100% by mass, even more preferably from 70 to 100% by mass. When the amount of the polyester in the film is at least 60% by mass, then it is favorable since the film of the invention can attain its own mechanical properties, satisfying the characteristic feature of the invention.

(Surface Treatment)

The biaxially-stretched polyester film of the invention is preferably processed for surface treatment such as corona discharge treatment, whereby its adhesiveness to metal may be further enhanced.

If desired, the film may be processed for any other surface-roughing treatment of embossing, sand-matting or the like, or surface treatment of corona discharge treatment, plasma treatment, alkali treatment or the like.

(Additive)

The film of the invention may contain any other material than the above-mentioned crystalline thermoplastic resin. Preferably, the film comprises, as the main ingredient thereof, one or more crystalline thermoplastic resins. (The main ingredient is meant to indicate the material of which the blend ratio is the highest of all the constitutive ingredients of the composition, and in an embodiment where the composition contains two or more crystalline thermoplastic resins as the main ingredient thereof, the total content thereof is higher than the content of any other ingredient in the composition.) The other material than the crystalline thermoplastic resin in the composition includes various additives, and their examples are fine particles, antistatic agent, stabilizer, antioxidant, crystal-nucleating agent, light stabilizer, UV absorbent, plasticizer, flame retardant, etc.

Also preferably, various additives may be added to the film for functionalizing the film surface. Apart from the above-mentioned additives, for example, a surface-eccentric additive capable of eccentrically-locating in the film surface may be favorably added to the film to thereby further enhance the surface adhesiveness of the film.

Fine Particles:

The film of the invention may contain one or more different types of fine particles for the purpose of satisfying all the requirements of handlability, proccessability and surface haze. The fine particles include those of inorganic compounds and those of organic compounds, and any of them are usable herein. The mean primary particle size of the fine particles to be in the crystalline thermoplastic resin in the invention is preferably from 0.005 to 3 µm from the viewpoint of reducing the haze of the film, more preferably from 0.007 to 2.5 µm, even more preferably from 0.01 to 2.0 µm. The mean primary particle size of fine particles as referred to herein is determined as follows: A crystalline thermoplastic resin is observed with a transmission electronic microscope (having a magnification of from 500,000 to 1,000,000 powers), and the primary particle size of 100 particles is measured, and the data are averaged to be the mean primary particle size of the fine particles.

The amount of the fine particles to be added is preferably from 0.001 to 3.0% by mass relative to the crystalline thermoplastic resin, more preferably from 0.001 to 2.0% by mass, even more preferably from 0.001 to 1.0% by mass.

For precipitation of fine particles for use herein, for example, employable are the methods described in JP-A 48-61556, 51-12860, 53-41355, 54-90397, etc. Further, other particles described in JP-A 55-20496, 59-204617, etc., may also be used in addition to the fine particles. However, particles having a mean particle size of more than 10 µm are unfavorable as causing film defects.

The fine particles include, for example, inorganic particles such as wet-process and dry-process silica, colloidal silica, aluminium silicate, titanium oxide, calcium carbonate, calcium phosphate, barium sulfate, alumina, mica, kaolin, clay, etc.; and organic particles comprising, as the constitutive ingredient thereof, styrene, silicone, acrylic acid, etc.

Two or more different types of these fine particles may be used herein. From the viewpoint of controlling the surface haze of the film, preferred are spherical particles, and more preferred are silica and alumina.

Antistatic Agent:

The film of the invention may contain one or more antistatic agents.

As the antistatic agent for use herein, preferred are ZnO, $TiO_2$, $SnO_2$, $Al_2O_3$, $In_2O_3SiO_2$, MgO, BaO, $MoO_3$, $V_2O_3$, etc.

The amount of the antistatic agent to be added is preferably from 0.05 to 10% by mass relative to the crystalline thermoplastic resin, more preferably from 0.1 to 5% by mass, even more preferably from 0.1 to 3% by mass.

Stabilizer:

The film of the invention may contain at least one stabilizer. Preferably, the stabilizer is added before or during hot melting of thermoplastic resin. The stabilizer is effective for antioxidation of film-constituting ingredients, for trapping the acids formed through decomposition, and for retarding or inhibiting the radical group-caused decomposition under light or heat. The stabilizer is effective for inhibiting degradation such as discoloration or molecular weight reduction to be caused by various types of decompositions including decomposition not as yet clarified, and also inhibiting formation of volatile ingredients. The stabilizer is required to be still effective to exhibit its function, without being decomposed at the resin melting temperature at which the resin is formed into a film. Typical example of the stabilizer includes phenol-type stabilizers, phosphite-type stabilizers, thioether-type stabilizers, amine-type stabilizers, epoxy-type stabilizers, lactone-type stabilizers, amine-type stabilizers, metal inactivators (tin-type stabilizers), etc. These are described in JP-A 3-199201, 5-1907073, 5-194789, 5-271471, 6-107854. Preferably, at lest one of phenol-type and phosphite-type stabilizers is used in the invention. Of phenol-type stabilizers, more preferred are those having a molecular weight of at least 500. Preferred phenol-type stabilizers include hindered phenol-type stabilizers.

These materials are readily available as commercial products, and are sold, for example, by the following manufacturers. Ciba Specialty Chemicals provides commercial products of Irganox 1076, Irganox 1010, Irganox 3113, Irganox 245, Irganox 1135, Irganox 1330, Irganox 259, Irganox 565, Irganox 1035, Irganox 1098, Irganox 1425WL. Asahi Denka Kogyo provides commercial products of Adekastab AO-50, Adekastab AO-60, Adekastab AO-20, Adekastab AO-70, Adekastab AO-80. Sumitomo Chemical provides commercial products Sumilizer BP-76, Sumilizer BP-101, Sumilizer GA-80. Shipro Chemical provides commercial products Seenox 326M, Seenox 336B.

As phosphite-type stabilizers, more preferred are the compounds described in JP-A 2004-182979, paragraphs [0023]-[0039]. Specific examples of phosphite-type stabilizers include compounds described in JP-A 51-70316, 10-306175, 57-78431, 54-157159, 55-13765. As other stabilizers, preferred are the materials described in detail in Hatsumei Kyokai Disclosure Bulletin (No. 2001-1745, issued on Mar. 15, 2001, by Hatsumei Kyokai), pp. 17-22.

The phosphite-type stabilizers are preferably high-molecular ones for securing the stability thereof at high temperatures, having a molecular weight of at least 500, more preferably at least 550, even more preferably at least 600. Also preferably, the stabilizers have an aromatic ester group as at least one substituent therein. Also preferably, the phosphite-type stabilizers are triesters, more preferably not mixed with impurities of phosphoric acid, monoester or diester. In case where the stabilizer contains such impurities, preferably, the content of the impurities is at most 5% by mass, more preferably at most 3% by mass, even more preferably at most 2% by mass. For the stabilizers of the type, usable are the compounds described in JP-A 2004-182979, [0023] to [0039], and also usable are the compounds described n JP-A 51-70316, 10-306175, 57-78431, 54-157159, 55-13765. Preferred examples of phosphite-type stabilizers are mentioned below. However, the phosphite-type stabilizers for use in the invention should not be limited to these.

Asahi Denka provides commercial products of Adekastab 1178, 2112, PEP-8, PEP-24G, PEP-36G, HP-10; and Clariant provides commercial products of Sandostab P-EPQ. Also preferred for use herein are stabilizers having both phenol and phosphite moieties in one molecule. The compounds are described in detail in JP-A 10-273494, and their examples are, but not limited thereto, within the scope of the examples of the stabilizers mentioned in the above. Typically, Sumitomo Chemical provides commercial products of Sumilizer GP. Further, Sumitomo Chemical provides other commercial products of Sumilizer TPL, TPM, TPS, TDP. Asahi Denka Kogyo provides commercial products of Adekastab AO-412S.

One or more of the above-mentioned stabilizers may be used herein either singly or as combined. Not detracting from the object of the invention, the amount of the stabilizer to be in the film may be suitably determined. Preferably, the amount of the stabilizer to be added is from 0.001 to 5% by mass relative to the mass of the thermoplastic resin, more preferably from 0.005 to 3% by mass, even more preferably from 0.01 to 0.8% by mass.

Crystal-Nucleating Agent:

The film of the invention may contain one or more crystal-nucleating agents. The crystal-nucleating agent is preferably added to the film from the viewpoint of enhancing the mechanical strength of the film.

The crystal-nucleating agent includes an inorganic crystal-nucleating agent and an organic crystal-nucleating agent. The inorganic crystal-nucleating includes, for example, talc, kaolinite, montmorillonite, synthetic mica, clay, silica, graphite, carbon black, zinc oxide, magnesium oxide, titanium oxide, calcium sulfide, boron nitride, calcium carbonate, barium sulfate, aluminium oxide, neodymium oxide, phenylphosphonate metal salts, etc.

The organic crystal-nucleating agent includes, for example, metal salts of organic carboxylates such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluilate, sodium salicylate, potassium salicylate, zinc salicylate, aluminium dibenzoate, potassium dibenzoate, lithium dibenzoate, sodium β-naphthalate, sodium cyclohexanecarboxylate, etc.; salts of organic sulfonates such as sodium p-toluenesulfonate, sodium sulfoisophthalate, etc.; carbonamides such as stearamide, ethylenebislauramide, palmitamide, hydroxystearamide, erucamide, trimeso-tris(t-butylamide), etc.; benzylidene sorbitol and its derivatives; salts of phosphorus compounds such as sodium 2,2'-methylenebis(4,6-di-t-butylphenyl)phosphate; 2,2-methylbis(4,6-di-t-butylphenyl)sodium, etc. One or more different types of these inorganic crystal-nucleating agent and organic crystal-nucleating agent can be used herein either singly or as combined.

The amount of the crystal-nucleating agent to be added is preferably from 0.01 to 10% by mass relative to the crystalline thermoplastic resin, more preferably from 0.05 to 5% by mass, even more preferably from 0.1 to 3% by mass.

Light Stabilizer:

The film of the invention may contain one or more light stabilizers. The light stabilizer includes hindered amine-type light stabilizers, HALS compounds, more concretely, 2,2,6,6-tetraalkylpiperidine compounds and their acid addition salts and their complexes with metal compounds, as in U.S. Pat. No. 4,619,956, columns 5-11, and U.S. Pat. No. 4,839,405, columns 3-5. Regarding these, Asahi Denka provides commercial products of Adekastab LA-57, LA-52, LA-67, LA-62, LA-77; and Ciba Speciality Chemicals provides commercial products of TINUVIN 765, 144.

One or more of these hindered amine-type light stabilizers may be used either singly or as combined. Needless-to-say, the hindered amine-type light stabilizer may be used, as combined with other additives such as plasticizer, stabilizer, UV absorbent, etc.; and it may be incorporated as a part of the molecular structure in these additives. The amount of the light stabilizer may be determined within a range not detracting from the effect of the invention, and in general, it may be from 0.01 to 20 parts by mass or so relative to 100 parts by mass of the thermoplastic resin, more preferably from 0.02 to 15 parts by mass or so, even more preferably from 0.05 to 10 parts by mass or so. The light stabilizer may be added in any stage of preparing a melt of thermoplastic resin composition, and for example, it may be added in the final step of that.

UV Absorbent:

The film of the invention may contain one or more UV absorbents. The UV absorbent is preferably one excellent in the ability of absorbing UV rays having a wavelength of not longer than 380 nm from the viewpoint of antioxidation, and not so much absorbing visible rays having a wavelength of not shorter than 400 nm from the viewpoint of transparency. For example, there are mentioned oxybenzophenone-type compounds, benzotriazole-type compounds, salicylate-type compounds, benzophenone-type compounds, cyanoacrylate-type compounds, and nickel complex-type compounds. Especially preferred UV absorbents are benzotriazole-type compounds and benzophenone-type compounds. Above all, benzotriazole-type compounds are more preferred as causing little unnecessary coloration of cellulose mixed esters. These are described in JP-A 60-235852, 3-199201, 5-1907073, 5-194789, 5-271471, 6-107854, 6-118233, 6-148430, 7-11055, 7-11056, 8-29619, 8-239509, 2000-204173.

The amount of the UV absorbent to be added is preferably from 0.01 to 2% by mass of the thermoplastic resin, more preferably from 0.01 to 1.5% by mass.

Plasticizer:

The film of the invention may contain a plasticizer. Adding a plasticizer to the film is favorable from the viewpoint of film reformation, for example, for improving the mechanical properties of the film, imparting flexibility to the film, imparting water absorbability to the film or reducing the moisture permeability of the film. In case where the film of the invention is produced according to a melt formation method, a plasticizer may be added to the film for the purpose of depressing the melting temperature of the film-constituting material through plasticizer addition thereto, than the glass transition temperature of the thermoplastic resin used, or for the purpose of reducing the viscosity of the resin composition at the same heating temperature than that of the thermoplastic resin to which the plasticizer is not added. For example, for the film of the invention, preferably used are plasticizers selected from phosphate derivatives and carboxylate derivatives. In addition, also preferably used are polymers produced through polymerization of ethylenic unsaturated monomers and having a weight-average molecular weight of from 500 to 10000, as in JP-A 2003-12859, as well as acrylic polymers, acrylic polymers having an aromatic ring in the side branches, and acrylic polymers having a cyclohexyl group in the side branches.

Flame Retardant:

The flame retardant for use herein is not specifically defined. For example, usable are red phosphorus and red phosphorus-based flame retardants such as typically stabilized red phosphorus prepared by microcapsulating the surface of red phosphorus with a known thermosetting resin and/or inorganic material; halogen-based flame retardants such as typically tetrabromobisphenol A, tetrabromobisphenol A oligomer, brominated bisphenol-based epoxy resin, brominated bisphenol-based phenoxy resin, brominated bisphenol-based polycarbonate, brominated polystyrene, brominated crosslinked polystyrene, brominated polyphenylene ether, polydibromophenylene ether, decabromodiphenyl oxide/bisphenol condensate, halogen-containing phosphate, etc.; organic phosphate-based flame retardants such as typically monophosphate compounds, e.g., triphenyl phosphate, etc., phosphate oligomers, e.g., resorcinol-bis(dixylenyl phosphate), bisphenol A bis(diphenyl phosphate), etc., spiro ring skeleton-having phosphates, e.g., pentaerythritol diphenyl diphosphate, pentaerythritol di(2,6-dimethyl-phenyl)diphosphate, etc., aromatic cyclic skeleton-having phosphates, e.g., 6-oxo-6-phenoxy-12H-dibenzo(d,g)(1,3,2)-dioxaphosphosine, 2,10-dimethyl-6-oxo-6-phenoxy-12H-dibenzo(d,g)(1,3,2)-dioxaphosphosine, 6-oxo-6-(2,6-dimethylphenoxy)-12H-dibenzo(d,g)(1,3,2)-dioxaphosphosine, etc., inorganic phosphates such as ammonium polyphosphate, aluminium phosphate, zirconium phosphate, etc.; hydrates of inorganic metal compounds such as aluminium hydroxide, magnesium hydroxide, etc.; inorganic flame retardants such as typically zinc borate, zinc metaborate, magnesium oxide, molybdenum oxide, zirconium oxide, tin oxide, antimony oxide, etc.; organic alkali (earth) metal salt-based flame retardants such as typically potassium perfluorobutanesulfonate, calcium perfluorobutanesulfonate, cesium perfluorobutanesulfonate, potassium diphenylsulfone-3-sulfonate, potassium diphenylsulfone-3,3'-disulfonate, etc.; phosphazene-based flame retardants such as typically phenoxyphosphazene oligomer, cyclic phenoxyphosphazene oligomer, etc.

The amount of the flame retardant to be added is preferably from 0.01 to 20% by mass relative to the crystalline thermoplastic resin, more preferably from 0.01 to 15% by mass, even more preferably from 0.01 to 3% by mass.

[Film Production Method]

The production method for film of the invention comprises leading a composition containing a crystalline thermoplastic resin having a temperature of higher than the crystallization temperature (Tc) of the resin to pass between a first nip-pressing surface and a second nip-pressing surface constituting a nip-pressing unit to thereby form it into a film, wherein the pressure to be given to the composition by the nip-pressing unit is from 5 to 1000 MPa, and wherein the film is expanded or subjected to shear deformation by the nip-pressing unit. The production method for film of the invention comprises feeding a composition comprising a crystalline thermoplastic resin having a temperature of higher than the crystallization temperature Tc of the resin to between a first nip-pressing surface and a second nip-pressing surface of a nip-pressing unit, and leading the composition to pass through the nip-pressing surfaces while the nip-pressing unit gives a pressure of from 5 to 1000 MPa to the composition, to thereby form the composition into a film continuously. The characteristic feature of the invention to be differentiated from conventional methods is that a film is formed by applying a great force to the crystalline thermoplastic resin having a temperature of higher than Tc in a nip-pressing unit. Specifically, in a conventional production method for a readily-formable crystalline thermoplastic resin film, a film is once formed, then the film must be stretched in a longitudinal stretching step (for stretching the film in the film-traveling direction in the direction perpendicular to the film-traveling direction) and thereafter the film must be further stretched in a lateral stretching step (for stretching the film in the direction perpendicular to the film-traveling direction) for suitably controlling the physical properties of the produced film. However, in the invention, a great pressure is given to the film being produced through a nip-pressing unit whereby the physical properties of the film can be improved while the film is produced. Accordingly, as compared with the conventional production method for a readily-formable crystalline thermoplastic resin film, the invention can greatly reduce the running cost and the facilities cost. Further, in the production method of the invention, as the crystalline thermoplastic resin, ordinary PET, PEN and others can be used directly as they are, not requiring any pretreatment, and therefore the materials cost is also low.

The nip-pressing unit having a first nip-pressing surface and a second nip-pressing surface includes, for example, a combination of two rolls, a combination of a roll and a touch belt as in JP-A 2000-219752 (one-side belt system), and a combination of a belt and a belt (double-side belt system). Of those, preferred is a combination of two rolls, as capable of imparting a uniform high pressure of from 5 to 1000 MPa to the resin composition. The roll pressure may be measured by leading a pressure test film (e.g., FUJIFILM's middle-pressure prescale) to pass between two rolls. The resin composition to be led through the nip-pressing unit may be a melt thereof or a solution thereof dissolved in a suitable solvent, but is preferably a melt, more preferably a melt prepared through extrusion.

The deformation to be imparted to the composition in the nip-pressing unit is not specifically defined. Since the composition passes between the first nip-pressing surface and the second nip-pressing surface of the nip-pressing unit, the deformation differs from simple compression deformation as in press-forming. For example, preferably, at least one deformation of elongation deformation and shear deformation is given to the composition; and the composition given any of elongation deformation or shear deformation can form the film of the invention. For imparting elongation deformation to the composition, for example, a pressure may be given to the composition in the nip-pressing unit having no difference in the moving speed between the first nip-pressing surface and the second nip-pressing surface thereof. On the other hand, for imparting shear deformation to the composition, for example, a pressure may be given to the composition in the nip-pressing unit having a difference in the moving speed between the first nip-pressing surface and the second nip-pressing surface thereof.

The production method for film of the invention (hereinafter this may be referred to as the production method of the invention) is described in detail hereinunder. In this description, a melt-extruded, crystalline thermoplastic resin-containing composition may be referred to as a melt.

<Melt Extrusion>

In the production method of the invention, preferably, a crystalline thermoplastic resin-containing composition (this may be referred to as "crystalline thermoplastic resin composition") is melt-extruded. Before melt-extruded, the crystalline thermoplastic resin composition is preferably pelletized. Some commercial products of crystalline thermoplastic resin (e.g., Noblen W151, etc.) are in the form of pellets; however, non-pelletized resins may be processed, for example, as follows.

The crystalline thermoplastic resin composition is dried, then melted in a double-screw kneading extruder at 150° C. to 300° C., then extruded like noodles, and solidified and cut in air or in water, and thereby giving pellets. After melted in the extruder, the melt may be directly cut while extruded into water through a nozzle to give pellets, according to an underwater cutting method. The extruder usable for pelletization includes a single-screw extruder, a non-engaging counter-rotating double-screw extruder, an engaging counter-rotating double-screw extruder, an engaging uni-rotating double-screw extruder, etc. Preferably, the number of revolutions of the extruder is from 10 rpm to 1000 rpm, more preferably from 20 rpm to 700 rpm. The extruder retention time is preferably from 10 seconds to 10 minutes, more preferably from 20 seconds to 5 minutes.

Not specifically defined, the size of the pellets may be generally from 10 mm³ to 1000 mm³ or so, preferably from 30 mm³ to 500 mm³ or so.

Before melt extrusion, preferably, the water content of the pellets is reduced. Preferably, the drying temperature is from 40 to 200° C., more preferably from 60 to 150° C. Thus dried, the water content of the pellets is reduced preferably to at most 1.0% by mass, more preferably at most 0.1% by mass. The pellets may be dried in air, or in nitrogen, or in vacuum.

Next, the dried pellets are fed into the cylinder of an extruder via the supply port thereof, then kneaded and melted therein. The inside of the cylinder comprises, for example, a supply section, a compression section, and a metering section in that order from the supply port thereof. The screw compression ratio in the extruder is preferably from 1.5 to 4.5; the cylinder length to the cylinder inner diameter (L/D) is preferably from 20 to 70; and the cylinder inner diameter is preferably from 30 mm to 150 mm. The die extrusion temperature (this may be referred to as melt temperature) may be determined depending on the melting temperature of the crystalline thermoplastic resin; and in general, it is preferably from 190 to 300° C. or so. For preventing the resin melt from being oxidized by residual oxygen, preferably, the extruder is purged with inert gas (nitrogen gas) or the like, or a vented extruder is used while evacuated.

Preferably, a filter unit with a breaker plate-type filter or a leaf-type disc filter is fitted to the system for removing impurities from the crystalline thermoplastic resin composition by filtration therethrough. The filtration may be one-stage or multi-stage filtration. Preferably, the filtration accuracy is from 15 μm to 3 μm, more preferably from 10 μm to 3 μm. Stainless steel is preferred for the filter material. The filter constitution includes knitted wire nets, and sintered metal fiber or metal powder articles (sintered filters); and preferred are sintered filters.

For increasing the thickness accuracy by reducing the melt discharge fluctuation, preferably, a gear pump is disposed between the extruder and the die. Accordingly, the resin pressure fluctuation inside the die may be reduced to ±1%. For enhancing the constant feeding capability of the gear pump, there may be employed a method of changing the number of screw revolutions to thereby constantly control the pressure before the gear pump.

In the extruder having the constitution as above, the resin composition is melted, and if desired, the resin melt is led to pass through a filter and a gear pump, and thereafter it is continuously transferred to the die. The die may be in any type of a T-die, a fishtail die, or a hanger coat die. Preferably, just before the die, a static mixer may be disposed for enhancing the uniformity of the resin temperature.

The clearance at the die outlet port part is generally from 1.0 to 30 times the film thickness, more preferably from 2.0 to 20 times.

In the production method of the invention, the radius of curvature at the tip of the die lip is not specifically defined, and any known die may be used in the invention.

Preferably, the die thickness is controllable within a range of from 5 to 50 mm. An automatic thickness-controlling die is also effective, for which the film thickness and the thickness deviation in the downstream area are computed, and the data are fed back to the die for thickness control thereof.

Apart from the single-layer film forming apparatus, a multilayer film forming apparatus is also usable herein.

The residence time taken by the thermoplastic resin composition to run into the extruder via the feeding port and then go out of it via the die is preferably from 3 minutes to 40 minutes, more preferably from 4 minutes to 30 minutes.

<Casting>

Next, preferably, the melt of crystalline thermoplastic resin-containing composition is extruded out as a film melt through the die, and the thus extruded melt is continuously pressed between the first nip-pressing surface and the second nip-pressing surface of a nip-pressing unit, and cooled and solidified therebetween to give a film. In this stage, preferably, the melt is released earlier from any one of the first nip-pressing surface and the second nip-pressing surface and thereafter from the other one, from the viewpoint of the production stability. In the production method of the invention, the relationship between the moving speed of the first nip-pressing surface and the moving speed of the second nip-pressing surface is not specifically defined; preferably, however, the moving speed of the first nip-pressing surface is higher than the moving speed of the second nip-pressing surface to thereby impart a shear stress to the film and control easy formability. In this stage, the surface from which the melt is released earlier than from the other may be either the first nip-pressing surface or the second nip-pressing surface; however, from the viewpoint of inhibiting formation of peel lumps, the surface from which the melt is released earlier is preferably the first nip-pressing surface (running at a higher moving speed).

In the production method of the invention, the extruded melt is continuously pressed between the first nip-pressing surface and the second nip-pressing surface constituting a nip-pressing unit to give a film, like in conventional methods; and in addition, a pressure of from 5 to 1000 MPa is imparted thereto between the nip-pressing surfaces thereby producing the film of the invention having the intended elongation at break and the intended yield stress. Preferably, the pressure to be given between the nip-pressing surfaces is from 20 to 500 MPa, more preferably from 25 to 300 MPa, even more preferably from 25 to 200 MPa, still more preferably from 30 to 150 MPa.

In the production method of the invention, the melt having a temperature of higher than Tc of the crystalline thermoplastic resin is led to pass through the first nip-pressing surface and the second nip-pressing surface constituting a nip-pressing unit, thereby forming a film continuously. In that manner, a film where the crystal growth is retarded can be produced.

The crystallization temperature of the crystalline thermoplastic resin can be determined with a differential scanning calorimeter (DSC). For example, when a polyester resin film is selected as a sample, the resin sample is put into a sample pan, this is heated in a nitrogen current from 30° C. to 300° C. (a temperature not lower than the melting point Tm of the polyester resin) at a speed of 10° C./min to melt the crystal completely, then cooled to 30° C. at a speed of −10° C./min; and the temperature at which the base line begins to deviate from the high-temperature side is taken as the crystallization temperature (Tc) of the film. The melting point (Tm) of the crystalline thermoplastic resin can be determined from a crystal fusion peak temperature and generally Tm is higher than Tc.

In the production method of the invention, preferably, the ratio of the moving speed of the second nip-pressing surface to that of the first nip-pressing surface, as defined by the following formula (I), is controlled to be from 0.600 to 0.999, and a shear stress is given to the resin melt while it passes through the nip-pressing unit in producing the film of the invention, from the viewpoint of increasing the tensile modulus and the strength of the obtained film. The moving speed ratio in the nip-pressing unit is preferably from 0.600 to 0.999, more preferably from 0.75 to 0.98.

$$\text{Moving Speed Ratio}=(\text{speed of second nip-pressing surface})/(\text{speed of first nip-pressing surface}) \qquad (I).$$

When the peripheral speed ratio of the two rolls is controlled to be from 0.600 to 0.999, then it is favorable since films that are hardly scratched on their surfaces and are mirror-finished to have good surface smoothness on both sides thereof can be produced stably.

(Melt Temperature)

In the production method of the invention, the melt temperature (temperature of the melt of the thermoplastic resin composition at the outlet port of the die) is preferably from Tm to (Tm+100)° C., more preferably (Tm+5)° C. to (Tm+70)° C., particularly preferably (Tm+10)° C. to (Tm+50)° C. from the viewpoint of improving the shapability of the resin and of preventing the deterioration thereof. Specifically, when the melt temperature is not lower than Tm, then the shapability is good since the viscosity of the resin can be sufficiently low; and when the temperature is not higher than (Tm+100)° C., then the resin may hardly deteriorate. By setting the melt temperature within the above range, the temperature of the resin composition just before fed into the nip-pressing unit can be easily controlled to a temperature higher than Tc.

(Air Gap)

In the production method of the invention, the air gap (the distance from the outlet port of the die to the melt landing point) is preferably as small as possible from the viewpoint of keeping the temperature of the melt between the die and the nip-pressing unit, and concretely, the air gap is preferably from 10 to 300 mm, more preferably from 20 to 250 mm, even more preferably from 30 to 200 mm. Difference between the melt temperature and the temperature of the resin composition just before fed to the nip-pressing unit is smaller when the air gap is shorter. The temperature difference is bigger when the air gap is longer.

(Line Speed)

In the production method of the invention, the line speed (film formation speed) is not lower than 2 m/min from the viewpoint of keeping the temperature of the melt staying in the air gap, more preferably not lower than 5 m/min, even more preferably not lower than 10 m/min. When the line speed is high, then the melt can be prevented from being cooled in the air gap and therefore more uniform deformation can be given to the melt while still hot in the nip-pressing unit. The line speed indicates the speed at which the melt passes through the nip-pressing unit and the film traveling speed in the conveyance unit.

In the production method of the invention, the width of the melt is not specifically defined, and may be, for example, from 200 to 2000 mm.

In the production method of the invention, preferably, the material of the first nip-pressing surface of the nip-pressing unit and the material of the second nip-pressing surface thereof are both those suitable for mirror finishing in order to mirror-finish both surfaces of the film; and for example, the two surfaces are both metallic.

(Casting Through Two Rolls)

As the method of continuously nip-pressing the above melt-extruded melt between the first nip-pressing surface and the second nip-pressing surface of a nip-pressing unit to form a film, preferred is an embodiment of leading the resin melt to pass between two rolls (e.g., touch roll (first roll) and chill roll (second roll)). In this description, when the filming system includes plural casting rolls for conveying the resin melt, the casting roll nearest to the most upstream die may be the chill roll. The preferred embodiment of the production method of the invention where two rolls are used is described below.

In the film production method of the invention, the landing point at which the melt extruded out from the above-mentioned die lands is not specifically defined. The distance between the melt landing point and the perpendicular line that runs through the center point in the space at a part at which the touch roll and the casting roll are kept nearest to each other may be zero, or the two may be deviated.

The melt landing point is meant to indicate the point at which the melt extruded out from the die is first brought into contact with the touch roll or the chill roll (or first lands on the roll). The center point of the space between the touch roll and the casting roll is meant to indicate the center point of the touch roll surface and the casting roll surface at the site at which the space between the touch roll and the casting roll is the narrowest.

Preferably, the surface of the two rolls (e.g., touch roll, casting roll) has an arithmetic mean height Ra of at most 100 nm, more preferably at most 50 nm, even more preferably at most 25 nm.

In the production method of the invention, the width of the two rolls is not specifically defined. The width may be freely varied in accordance with the width of the film-like melt.

The roll pressure between the two rolls is from 5 to 1000 MPa, preferably from 20 to 500 MPa, more preferably from 25 to 300 MPa, even more preferably from 25 to 200 MPa, still more preferably from 30 to 150 MPa.

In the production method of the invention, the cylinder parameter values may be suitably changed for controlling the roll pressure to fall within the above-mentioned range. The cylinder parameter values may differ depending on the resin material to be used and the materials of the two rolls. For example, when the effective width of the film-like melt is 200 mm, the value is preferably from 3 to 100 KN, more preferably from 3 to 50 KN, even more preferably from 3 to 25 KN.

In the production method of the invention, preferably, the Shore hardness of the rolls is preferably at least 45 HS for controlling the roll pressure to fall within the above range. The Shore hardness of the two rolls above is more preferably at least 50 HS, still more preferably 60 to 90 HS.

The Shore hardness is determined according to a method of JIS Z 2246 where a roll is tested at 5 points in the roll width direction and at 5 points in the roll peripheral direction and the data are averaged.

Regarding their material, preferably, the two rolls are made of metal from the viewpoint of attaining the above-mentioned Shore hardness, more preferably they are made of stainless metal. Preferably, the two rolls are made of metal, as their surface roughness is low and therefore the surface of the produced film is hardly scratched. On the other hand, rubber rolls and rubber-lined metal rolls are also usable with no limitation so far as they can attain the above-mentioned high pressure between two rolls. In particular, in the film production method of the invention, preferably, the material of the surfaces of the two rolls is preferably one suitable for mirror finishing in order to mirror-finish both surfaces of the film; and for example, the two surfaces are both metallic.

As the touch roll, for example, usable are those described in JP-A 11-314263, 2002-36332, 11-235747, WO97/28950, JP-A 2004-216717, 2003-145609.

In the production method of the invention, preferably, the film is produced in such a manner that the peripheral speed ratio of the two rolls between which a filmy melt is led to pass is controlled to thereby impart a shearing force to the resin melt while passing through the two rolls, from the viewpoint of increasing the tensile modulus and the strength of the film produced. Preferably, the peripheral speed ratio of the two rolls is from 0.600 to 0.999, more preferably from 0.75 to 0.98. In this, the peripheral speed ratio of two rolls means a ratio of peripheral speed of the roll running slower/peripheral speed of the roll running faster.

When the peripheral speed ratio of the two rolls is controlled to be from 0.600 to 0.999, then it is favorable since films that are hardly scratched on their surfaces and are mirror-finished to have good surface smoothness on both sides thereof can be produced stably.

In producing the film of the invention, any of the two rolls may run at a higher speed. When the running speed of the touch roll is low, a bank (an excessive melt staying on the roll to form a deposit thereon) is formed on the side of the touch roll. As the touch roll has a shorter period of time than that of the chill roll for which it is kept in contact with the melt, the bank formed on the side of the touch roll could not be fully cooled, therefore giving peel lumps and thereby causing surface failures. Accordingly, it is desirable that the roll running slower is the chill roll (second roll) and the roll running faster is the touch roll (first roll) from the view point that good surface smoothness on both sides of the produced film can be attained stably.

In the production method of the invention, preferably, rolls having a large diameter are sued as the two rolls. Concretely, the two rolls for use herein preferably have a diameter of from 200 to 1500 mm, more preferably from 300 to 1000 mm, still more preferably 350 to 800 mm, still more preferably 350 to 600 mm, even more preferably 350 to 500 mm. When such rolls having a large diameter are used, then the contact area between the filmy melt and the roll may be broad and the time for which pressure is given to the melt may be longer, and therefore the mechanical characteristics of the films produced can be prevented from fluctuating. In the production method of the invention, the diameter of the two rolls may be the same or different.

In the production method of the invention, the two rolls may be driven at the same speed or at a different speed; but preferably, the two are driven at a different speed. The two rolls may move as a subsidiary driving mode or a independent driving mode; preferably, however, the two move as an independent driving mode for inhibiting the fluctuation of the mechanical characteristics of the films formed.

For controlling the mechanical characteristics of the films to be formed, the two rolls may have a difference in the surface temperature thereof. A preferred temperature difference is from 5° C. to 80° C., more preferably from 20° C. to 80° C., even more preferably from 20° C. to 60° C. The temperature of the two rolls is preferably lower than the crystallization temperature Tc of the crystalline thermoplastic resin. It is preferably a temperature under which a film formed from the composition can be released from the rolls without causing any problems. For example, when a polyester resin is used, the temperature of the two rolls may be so controlled, based on the glass transition temperature Tg of the resin, that it falls from Tg−100° C. to Tg+20° C., more preferably from Tg−70° C. to Tg+10° C., even more preferably from Tg−60° C. to Tg+5° C. The temperature control may be attained by introducing a temperature-conditioned liquid or gas into the inside of the touch roll.

The glass transition temperature of the crystalline thermoplastic resin may be determined as follows: Using a differential scanning calorimeter (DSC), a resin sample is put into a sample pan, this is heated in a nitrogen current from 30° C. to 300° C. at 10° C./min (1st run), then cooled to 30° C. at −50° C./min, and then again heated from 30° C. to 300° C. at 10° C./min (2nd run). In the 2nd run, the temperature at which the base line begins to deviate from the low-temperature side is taken as the glass transition temperature (Tg) of the film. Generally, Tc is higher than Tg.

In the production method of the invention, preferably, the melt extruded from the die is kept warmed just before it is brought into contact with at least any one of the two rolls to thereby reduce the temperature fluctuation in the width direction; concretely, the temperature fluctuation of the melt in the width direction is within 5° C. For reducing the temperature fluctuation, preferably, a shielding member having a heat-insulating function or a heat-reflecting function is disposed in at least a part of the melt path between the die and the two rolls to thereby shield the melt from fresh air (see for example FIG. 8). When such a heat-insulting member is disposed in the pathway in the manner as above to thereby shield the melt from fresh air, then the melt is protected from being exposed to the external environments such as air, and therefore the temperature fluctuation in the film-like melt in the width direction thereof can be reduced. The temperature fluctuation in the film-like melt in the width direction is preferably within ±3° C., more preferably within ±1° C.

Further, when the shielding member is used, then the film-like melt may be led to pass between the rolls while its temperature is high, or that is, while its melt viscosity is low, and the member is therefore effective for facilitating the film production in the invention.

The temperature profile of the film-like melt may be determined, using a contact thermometer or a non-contact thermometer.

For example, the shielding member may be disposed, for example, on the inner side than both edges of the two rolls and as spaced from the side in the width direction of the die. The shielding member may be fixed directly to the side of the die, or may be fixed thereto as supported by a supporting member. The width of the shielding member is, for example, preferably the same as or longer than the width of the side of the die in order to efficiently block the ascending air current to be generated by heat radiation by the die.

The gap between the shielding member and the edge in the width direction of the film-like melt is preferably made narrow for efficiently blocking the ascending air current that runs along the roll surface, more preferably about 50 mm or so from the edge in the width direction of the film-like melt. Not always needed, the gap between the side surface of the die and the shielding member is preferably such that the air current in the space surrounded by the shielding member could be discharged therethrough, for example, at most 10 mm.

As the material having a heat-insulating function and/or a heat-reflecting function, preferred is a baffle plate excellent in air shieldability and heat retentiveness, and for example, preferred is a stainless or the like metal plate.

For preventing the mechanical characteristics of the film from fluctuating, employable is a method of enhancing the adhesiveness of the filmy melt to the casting roll. Concretely, an static electricity-imparting method, an air knife method, an air chamber method, a vacuum nozzle method and the like may be suitably combined in a desired manner thereby enhancing the adhesiveness of the melt to the roll. The adhesiveness-enhancing method may be applied entirely or partly to the surface of the filmy melt.

After thus formed, the film-like melt is preferably cooled, using at least one casting roll in addition to the two rolls between which the film is led to pass (e.g., casting roll and touch roll). The touch roll is generally so disposed that it can touch the first casting roll on the most upstream side (nearer to the die). In general, three cooling rolls are used in a relatively popular method, which, however, is not limitative. The distance between the plural casting rolls is preferably from 0.3 mm to 300 mm as a face-to-face gap therebetween, more preferably from 1 mm to 100 mm, even more preferably from 3 mm to 30 mm.

Preferably, the processed film is trimmed on both sides thereof. The part trimmed away from the film may be recycled as a film-forming material. Also preferably, the film is knurled on one side or both sides thereof. The height of the knurl formed by the knurling treatment is preferably from 1 μm to 50 μm, more preferably from 3 μm to 20 μm. In the knurling treatment, a protrusion may be formed on one surface or both surfaces. The width of the knurl is preferably from 1 mm to 50 mm, more preferably from 3 mm to 30 mm. The knurling treatment may be carried out at room temperature to 300° C.

Also preferably, a laminate film is attached to one surface or both surfaces of the film before winding it. The thickness of the laminate film is preferably from 5 μm to 100 μm, more preferably from 10 μm to 50 μm. Not specifically defined, its material may be any of polyethylene, polyester, polypropylene, etc.

The tension for winding the film is preferably from 2 kg/m-width to 50 kg/m-width, more preferably from 5 kg/m-width to 30 kg/m-width.

<Stretching, Relaxation>

After formed according to the above-mentioned method, the film may be stretched and/or relaxed. For example, the film may be processed according to the following process (a) to (g).
(a) Lateral stretching
(b) Lateral stretching→relaxation
(c) Longitudinal stretching
(d) Longitudinal stretching→relaxation
(e) Longitudinal (lateral) stretching→lateral (longitudinal) stretching
(f) Longitudinal (lateral) stretching→lateral (longitudinal) stretching→relaxation
(g) Lateral stretching→relaxation→longitudinal stretching→relaxation Of those, especially preferred is the process including lateral stretching, concretely, the process of lateral stretching followed by relaxation. As the case may be, the film may be stretched biaxially; and after once laterally stretched, the film may be further biaxially stretched.

A tenter may be used for lateral stretching. Specifically, both sides in the width direction of the film are held with clips, and the film is expanded in the lateral direction. In this case, air at a predetermined temperature may be introduced into the tenter for controlling the stretching temperature. The stretching temperature is preferably from room temperature to (Tg+60)° C., more preferably from room temperature to (Tg+45)° C., even more preferably from room temperature to (Tg+20)° C. Preferably, the lateral draw ratio is from 1.2 to 12.0 times, more preferably from 1.2 to 10.0 times, even more preferably from 1.2 to 8.0 times.

Before stretched, the film may be preheated, and after stretched, it may be thermally fixed, whereby the alignment angle fluctuation with bowing can be reduced. These steps are not essential in the invention. Any one of preheating and thermal fixation may be attained, but preferably, these are both attained. In preheating and thermal fixation, preferably, the film is held with clips, or that is, it is desirable that the preheating, the stretching and the thermal fixation of the film are attained continuously.

The preheating temperature may be higher by from 1° C. to 50° C. or so than the stretching temperature, and is preferably higher by from 2° C. to 40° C., more preferably by from 3° C. to 30° C. Preferably, the heating time is from 1 second to 10 minutes, more preferably from 5 seconds to 4 minutes, even more preferably from 10 seconds to 2 minutes. During the preheating, the tenter width is preferably kept nearly constant. The wording "nearly" is meant to indicate ±10% of the width of the unstretched film.

The thermal fixation may be attained at a temperature lower by from 1° C. to 50° C. than the stretching temperature, more preferably lower by from 2° C. to 40° C., even more preferably by from 3° C. to 30° C. Still more preferably, the thermal fixation temperature is not higher than the stretching temperature and not higher than Tg. The time of the thermal fixation is preferably from 1 second to 10 minutes, more preferably from 5 seconds to 4 minutes, even more preferably from 10 seconds to 2 minutes. During the thermal fixation, the tenter width is preferably kept nearly constant. The wording "nearly" is meant to indicate a range of from 0% of the tenter width after the stretching treatment (the same width as the tenter width after the stretching treatment) to −10% thereof (smaller by 10% than the tenter width after the stretching treatment=width reduction). When the width of the film is expanded more than the stretched width, then it is unfavorable since residual strain may remain in the film.

The longitudinal stretching may be attained by leading the film to pass between two pairs of rolls under heat while the peripheral speed of the rolls on the outlet port side is made higher than that of the rolls on the inlet port side. In this stage, the retardation expressibility in the thickness direction of the film may be controlled by changing the distance between the rolls (L) and the width of the unstretched film (W). When L/W (referred to as an aspect ratio) is from 2 to 50 (long-spun stretching), films having a small Rth are easy to produce; and when L/W is from 0.01 to 0.3 (short spun), then films having a large Rth may be produced. Embodiments in this invention, any of long-spun stretching, short-spun stretching, stretching in the range between the two (middle stretching, L/W is from more than 0.3 to 2) may be employed; but preferred are long-spun stretching and short-spun stretching in which the alignment angle can be reduced. More preferably, the stretching modes are differentiated to the effect that short-spun stretching is employed for producing films having a high Rth, and long-spun stretching is employed for producing films having a low Rth.

The stretching temperature is preferably from (Tg−10)° C. to (Tg+60)° C., more preferably from (Tg−5)° C. to (Tg+45)° C., even more preferably from (Tg−10)° C. to (Tg+20)° C. Also preferably, the longitudinal draw ratio is from 1.2 to 5.0 times, more preferably from 1.2 to 4.5 times, even more preferably from 1.2 to 4.0 times.

After stretched, the film may be further processed for relaxation to enhance the dimensional stability thereof. After the film formation, the thermal relaxation may be attained after any of longitudinal stretching or lateral stretching, but preferably every after the two. The relaxation may be attained on-line continuously after stretching, but may be off-line after the stretched film is wound up.

Preferably, the thermal relaxation is attained at from (Tg−30)° C. to (Tg+30)° C., more preferably from (Tg−30)° C. to (Tg+20)° C., even more preferably from (Tg−15)° C. to (Tg+10)° C., preferably for 1 seconds to 10 minutes, more preferably for 5 seconds to 4 minutes, even more preferably for 10 seconds to 2 minutes, while conveyed under tension of preferably from 0.1 kg/m to 20 kg/m, more preferably from 1 kg/m to 16 kg/m, even more preferably from 2 kg/m to 12 kg/m.

<<Laminate Film>>

An additional layer may be laminated on the film of the invention to give a laminate film. The layer to be aminated is not specifically defined. Accordingly, the film of the invention may be a single-layer film or a laminate film. In case where the film is formed as a laminate film, a polymer such as a thermoplastic polymer or a thermosetting polymer may be laminated thereon. In one example of the laminate film of the invention, an additional polyester film is laminated on one surface of the film of the invention to give a laminate film, which is excellent in adhesiveness and flexibility. As the polyester film for lamination, for example, preferred are high-molecular-weight polyethylene terephthalate, isophthalic acid-copolymerized polyethylene terephthalate, butanediol/isophthalic acid residue skeleton-having polyethylene terephthalate copolymer, diethylene glycol-added or copolymerized polyester, etc.

The laminate layer constitution is not specifically defined. For example, the film of the invention may be laminated on one surface to give a two-layer laminate; or it may be laminated in a center to give a three-layer laminate; or two or more different types of films may be laminated; or four or more layers may be laminated to give a multilayer laminate film.

In producing the laminate film, the production method for it is not specifically defined. For example, there may be employed a method where layers are formed one by one and they are laminated in order and solidified to give a laminate film; an ordinary lamination method; a simultaneous or successive co-casting method, etc. Of those, preferred is a simultaneous co-casting method, for which, concretely, a lamination die may be used.

Simultaneous co-casting with a lamination die is described with reference to FIGS. 2 to 5. Two different types of crystalline thermoplastic resin-containing composition melts A and B are continuously fed into the die (see FIG. 2). The die 24 shown in FIG. 3 comprises a feed block 25 where the two crystalline thermoplastic resin-containing composition melts A and B are made to join together to form a three-layered sheet, and a single-layer die 24a where the joined crystalline thermoplastic resin-containing composition melts A and B is widened.

To the flow pass 70 of the feed block 25, supplied is the crystalline thermoplastic resin-containing composition melt B, and to the flow passes 72 and 74 of the feed block 25, supplied is the crystalline thermoplastic resin-containing composition melt A, from the extruders 22 and 23, respectively. The flow passes 70, 72 and 74 join together at the junction 76; and the crystalline thermoplastic resin-containing composition melts A and B therefore join together at the junction 76, then run through the flow pass and are fed to the single-layer die 24a. The crystalline thermoplastic resin-containing composition melts A and B are widened in the manifold 80 of the single-layer die 24a, and then discharged out onto the chill roll 28 from the melt discharge port 84 via the slit 82. As in FIG. 4, when the distance (lip land length), M, between the manifold 80 and the melt discharge port 84 of the die 24 is within a range of from 5 mm to 150 mm, then the structure exhibits a smoothing effect and may reduce the surface roughness of the crystalline thermoplastic resin film 12. The lip land length M may be from 5 mm to 150 mm not bringing about any problem, but is preferably from 10 mm to 120 mm, more preferably from 30 mm to 100 mm.

Figure 3:
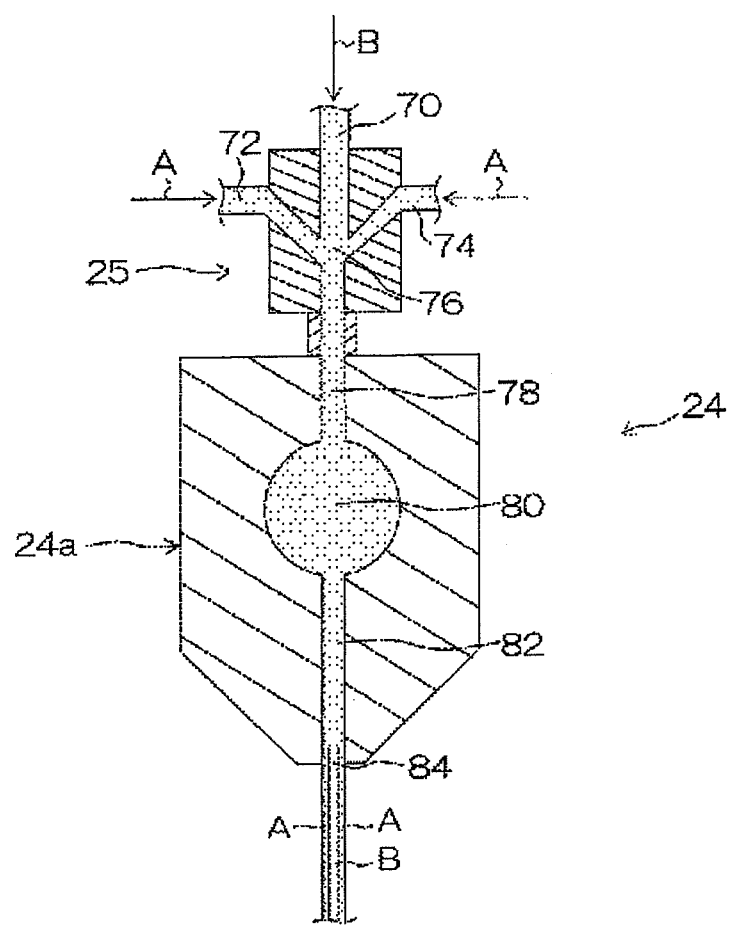
FIG. 3 is an outline view of a die to which the invention is applicable.
Figure 4:
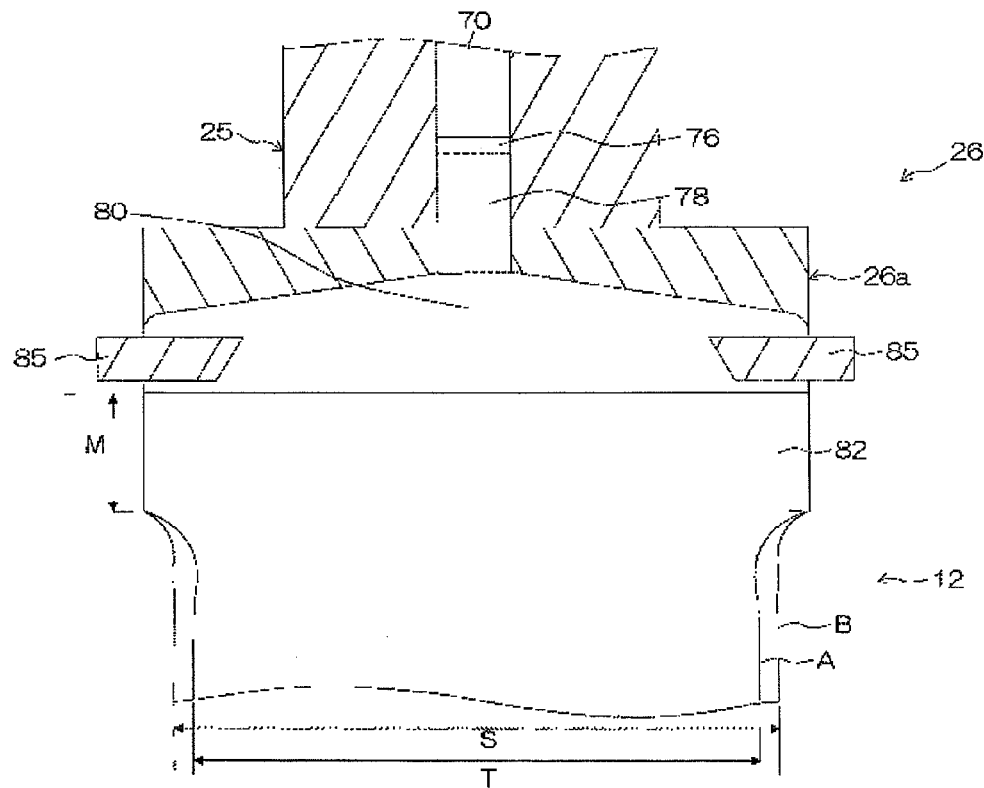
FIG. 4 is an outline view of a die to which the invention is applicable.

FIG. 4 is a cross-sectional view of the die 24 shown in FIG. 3, on which the die 24 is seen in the direction in which the resin melt passes through the flow passes 70 and 78 and through the slit 82 and is discharged out.

Through the tip (bottom) of the die 24, the crystalline thermoplastic resin-containing composition melt is discharged. Preferably, as in FIG. 4, the width of the manifold 80 of the single-layer die 24a is adjusted by the movable resistors 85 and 85 disposed at both edges of the manifold 80, whereby the crystalline thermoplastic resin-containing composition melt A is widened in the cross direction thereof. In general, the resin melt may stay at both edges of the manifold 80, and in a case of coextrusion, the crystalline thermoplastic resin-containing composition corresponding to the outer layer may receive flow resistance with the result that the width T of the outer layer may be narrower than the width S of the inner layer. The movable resistors 85 and 85 disposed at suitable positions in both edges of the manifold 80 may change the resin flow, and therefore the crystalline thermoplastic resin-containing composition of the outer layer may be widened in the cross direction. In particular, when the width T of the outer layer is at least 99% of the overall width of the film (width of the inner layer) S, then it may prevent the crystalline thermoplastic resin-containing composition B of the inner layer having a lower Tg from sticking to the rollers 26 and 28, and in addition, nearly the entire width of the film may be used as a product.

The thickness of the outer layer of the film is made to fall within a range of from 10 to 90% of the overall thickness of all the layers of the film. This may be attained by narrowing the flow passes 72 and 74. Since the thickness of the outer layer is within a range of from 10 to 90% of the overall thickness of the film, the inner layer in a liquid state may sufficiently receive the pressure force from the rolls 26 and 28 to be mentioned below, and therefore the residual strain in the film may be reduced. Accordingly, a crystalline thermoplastic resin film 12 favorable for use for optical high-function films can be provided. When the thickness of the outer layer is less than 10% of the overall thickness of the film, then Tg of the film may be too low as a whole, and the film could hardly be cooled and solidified even when sandwiched between a pair of rollers. On the other hand, when the thickness of the outer layer is more than 90% of the overall thickness of the film, then the inner layer shall be too thin and the film could not be cushiony, and therefore the film is ineffective for absorbing the surface pressure of the pair of rollers. The thickness of the outer layer may be within a range of from 10 to 90% of the overall thickness of the film with no problem, but is preferably from 20 to 80%, more preferably from 30 to 70%.

Figure 5:
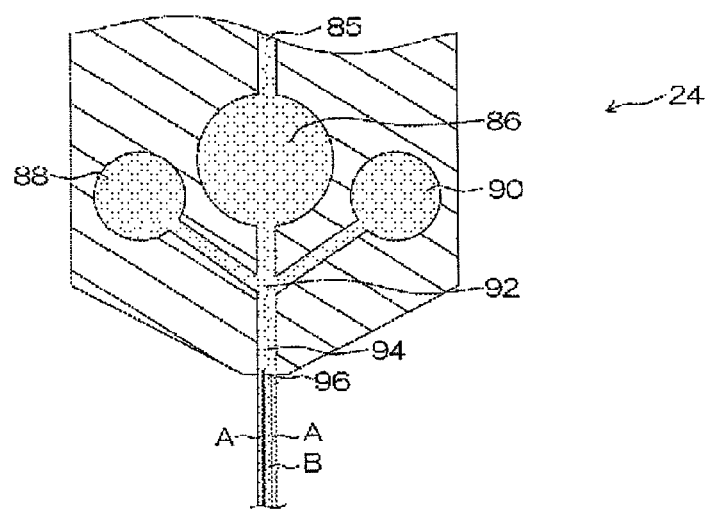
FIG. 5 is a cross-sectional outline view of a die to which the invention is applicable.

FIG. 5 is an outline view of an another embodiment of the multi-manifold die 24 having plural (3 in FIG. 5) manifolds 86, 88 and 90. Into the manifold 86, supplied is the crystalline thermoplastic resin-containing composition B from the extruder 23 via the flow pass 85; and into the manifolds 88 and 90, supplied is the crystalline thermoplastic resin-containing composition A from the extruder 22 via a flow pass (not shown); and these join together at the junction 92, and are jetted out onto the chill roll 28 through the melt discharge port 96 via the slit 94. In that manner, since the die 24 has a multi-manifold structure, through which, therefore, the inner layer and the outer layer to be formed may have a uniform thickness, and in which, in addition, the two types of the crystalline thermoplastic resin-containing composition melts may be prevented from turning around each other. Though not shown, movable resistors may also be disposed at suitable positions in this die, like in the feed block-based die in FIG. 3, whereby the crystalline thermoplastic resin-containing composition of the outer layer may be widened in the cross direction of the layer.

EXAMPLES

The invention is described more concretely with reference to the following Examples, in which the material, the reagent and the substance used, their amount and ratio, and the details of the treatment may be suitably modified or changed. Accordingly, the invention should not be limited to the Examples mentioned below.

Method for Measurement

Tensile Modulus, Yield Stress, Elongation at Break, Stress at Break

A sample of 10 mm×150 mm in size is conditioned at 25° C. and a relative humidity of 65% for 2 hours. Using Toyo Boldwin's universal tensile tester, STM T50BP, the sample having an initial length of 100 mm is stretched in an atmosphere at 23° C. and 60% RH at a speed of 10%/min, and its stress/strain curve is drawn. On the curve, the entitled data are read. Elongation at break was measured along MD.

Production Example 1

Production of PET

In an esterification reactor, 100 parts of terephthalic acid, 50 parts of ethylene glycol, 0.1 parts of magnesium acetate tetrahydrate, and 0.035 parts of antimony trioxide were put, then the inner pressure was increased up to 3.5 kg/cm$^2$ with nitrogen introduced thereinto, and the contents were gradually heated with stirring. While water formed in the reaction was removed through the distillation tower, the reaction was continued until 90% of the theoretical amount of water to be produced was evaporated away. Next, the reaction product was transferred into a polycondensation tank, then 20% ethylene glycol slurry was added to it, and 0.035 parts of trimethyl phosphate dissolved in 0.5 parts of ethylene glycol was added thereto. After the addition, this was left as such while kept stirred for 10 minutes, and then the system was gradually degassed and reacted for polycondensation at 280 to 300° C. for about 2 hours, thereby producing a PET resin. The crystal melting temperature of the resin was 257° C., the crystallization temperature thereof was 220° C., and the glass transition temperature thereof was 80° C.

Production Example 2

Production of PEN

In an esterification reactor, 100 parts of dimethyl 2,6-naphthalenedicarboxylate, 58.4 parts of ethylene glycol, 0.03 parts of magnesium acetate tetrahydrate, and 0.025 parts of antimony trioxide were put, and then the contents were heated up to 200° C. with stirring. While methanol formed in the reaction was removed through the distillation tower, the inner temperature was elevated at a rate of 20° C./hr up to be 250° C. After the finish of the side production of methanol was confirmed, the reaction product was transferred into a polycondensation tank, then 20% ethylene glycol slurry was added to it, and 0.021 parts of phosphoric acid dissolved in 0.5 parts of ethylene glycol was added thereto. After the addition, this was stirred for 10 minutes, and then the system was gradually degassed and reacted for polycondensation at 280 to 300° C. for about hours, thereby producing polyethylene 2,6-naphthalate. The crystal melting temperature of the resin was 276° C., the crystallization temperature thereof was 230° C., and the glass transition temperature thereof was 120° C.

Example 1

Production of Film

The above-mentioned PET resin was dried at 100° C. for hours, then melted at 260° C., and kneaded and extruded through a single-screw kneading extruder. In this stage, a screen filter, a gear pump and a leaf disc filter were disposed in that order between the extruder and the die, and these were connected to each other via a melt pipe. The melt was extruded out through a die having a width of 450 mm and a lip gap of 1 mm, at an extrusion temperature (melt temperature) of 280° C.

Thus, the melt (resin melt) was cast between a casting roll and a touch roll. In this stage, the cylinder was so designed that a touch pressure (center pressure) of 40 MPa could be applied to the casting roll (chill roll) having a width of 1800 mm and a diameter of 400 mm on the most upstream side, and a touch roll having a width of 200 mm and a diameter of 350 mm was kept in contact with the casting roll. The touch pressure was determined as follows: Using a middle-pressure prescale (by FUJIFILM), the two rolls were driven at the same peripheral speed (5 m/min) with no melt introduced between them, and the pressure between the two was measured. This was the pressure in film formation. The melt was landed in the center part sandwiched between the casting roll and the touch roll. The surface material of the touch roll and the chill roll was hard chromium, and the roll temperature was set at 30° C. The film was produced using these rolls. The peripheral speed ratio of the touch roll and the chill roll was 0.90. The space between the die and the melt landing point is covered by wind shielding plates. The distance between the die and the meld-landing point was 200 mm. The temperature of the composition just before fed to the nip-pressing unit is 240° C. The atmosphere in film formation was at 25° C. and 60% RH.

Next, just before wound up, the film was trimmed on both sides (about 5 cm of the overall width) thereof, and then knurled on both sides thereof to a width of 10 mm and a height of 20 μm. Having a width of 200 mm, the formed film was wound up at a machine speed of 5 m/min (chill roll speed) to a length of 450 m. Thus formed, the film had a thickness of 100 μm, and this is a film of Example 1.

Comparative Example 1

An unstretched PET film (A-PET) having a thickness of 100 μm was produced in the same manner as in Example 1, for which, however, the touch roll and the chill roll were not used for nip-pressing.

Comparative Example 2

The A-PET film of Comparative Example 1 was stretched by 3.3 times at 85° C. in the longitudinal direction, and then by 3.7 times at 155° C. in the lateral direction, and thereafter thermally fixed at 250° C. to give a biaxially stretched PET film (C-PET).

Examples 2 to 15 and Comparative Examples 3 to 5

The films of s 2 to 15 and Comparative Examples 3 to 5 were produced in the same manner as in Example 1, for which, however, the condition in film formation was changed as in Table 1 below.

(Physical Properties of Film)

The films thus produced in Examples 1 to 15 and Comparative Examples 1 to 5 were analyzed for the thickness, the yield stress, the elongation at break, the stress at break and the tensile modulus thereof, and the data are shown in Table 1. In addition, the condition of the film surface and Ra is also shown in Table 1.

therefore excellent in formability and that the film is a crystalline thermoplastic resin film mirror-finished on both sides thereof. Orientation degree of the film of Example 1 is low on its surface and high in its inside. The films of Comparative Example 1 and Comparative Example 2 could not attain the characteristics of the film of Example 1. It is known that the film of the invention has good and well-balanced physical

TABLE 1

|  | Resin | Cylinder Parameter Value (KN) | Touch Pressure (MPa) | Shore Hardness (HS) | Speed of Touch Roll (m/min) | Speed of Chill Roll (m/min) | Peripheral Speed Ratio | Melt Temperature at Outlet Port of Die (° C.) | Melt Temperature just before fed to nip-pressing unit (° C.) |
|---|---|---|---|---|---|---|---|---|---|
| Example 1 | PET | 6 | 40 | 60 | 5.5 | 5.0 | 0.90 | 280 | 240 |
| Example 2 | PET | 2 | 10 | 55 | 5.3 | 5.0 | 0.90 | 280 | 240 |
| Example 3 | PET | 3 | 20 | 50 | 5.3 | 5.0 | 0.90 | 280 | 240 |
| Example 4 | PET | 12 | 80 | 65 | 5.3 | 5.0 | 0.90 | 280 | 240 |
| Example 5 | PET | 25 | 160 | 68 | 5.3 | 5.0 | 0.90 | 280 | 240 |
| Example 6 | PET | 50 | 250 | 72 | 5.3 | 5.0 | 0.90 | 280 | 240 |
| Example 7 | PET | 75 | 400 | 77 | 5.6 | 5.0 | 0.90 | 280 | 240 |
| Example 8 | PET | 6 | 40 | 60 | 5.0 | 5.0 | 1.00 | 275 | 235 |
| Example 9 | PET | 6 | 40 | 60 | 5.0 | 5.0 | 1.00 | 300 | 260 |
| Example 10 | PET | 6 | 40 | 60 | 5.0 | 5.0 | 1.00 | 320 | 280 |
| Example 11 | PET | 6 | 40 | 60 | 5.0 | 5.0 | 1.00 | 280 | 240 |
| Example 12 | PET | 6 | 40 | 60 | 5.1 | 5.0 | 0.98 | 280 | 240 |
| Example 13 | PET | 6 | 40 | 60 | 6.0 | 5.0 | 0.83 | 280 | 240 |
| Example 14 | PET | 6 | 40 | 60 | 8.0 | 5.0 | 0.63 | 280 | 240 |
| Example 15 | PEN | 6 | 40 | 60 | 5.5 | 5.0 | 0.90 | 300 | 260 |
| Comparative Example 1 | PET | no touch roll | | | | 5.0 | — | 280 | 240 |
| Comparative Example 2 | PET | no touch roll + biaxial stretching | | | | 5.0 | — | 280 | 240 |
| Comparative Example 3 | PET | 1 | 3 | 40 | 5.5 | 5.0 | 0.90 | 280 | 240 |
| Comparative Example 4 | PET | 200 | 1100 | 77 | 5.5 | 5.0 | 0.90 | 280 | 240 |
| Comparative Example 11 | PET | 6 | 40 | 60 | 5.5 | 5.0 | 0.90 | 260 | 220 |

|  | Thickness (μm) | Yield Stress (MPa) | Elongation at Break (%) | Stress at Break (MPa) | Tensile modulus (MPa) | Film Surface | Ra (nm) |
|---|---|---|---|---|---|---|---|
| Example 1 | 100 | 77 | 271 | 109 | 2420 | A | 13 |
| Example 2 | 100 | 42 | 350 | 65 | 2210 | A | 24 |
| Example 3 | 100 | 53 | 300 | 80 | 2280 | A | 22 |
| Example 4 | 100 | 92 | 223 | 111 | 2630 | A | 13 |
| Example 5 | 100 | 98 | 198 | 125 | 2710 | A | 15 |
| Example 6 | 100 | 104 | 165 | 140 | 2820 | A | 15 |
| Example 7 | 100 | 105 | 160 | 140 | 2850 | A | 20 |
| Example 8 | 100 | 80 | 176 | 96 | 2550 | A | 29 |
| Example 9 | 100 | 65 | 299 | 103 | 2380 | A | 16 |
| Example 10 | 100 | 58 | 321 | 98 | 2340 | A | 18 |
| Example 11 | 100 | 80 | 350 | 100 | 2420 | A | 13 |
| Example 12 | 100 | 71 | 298 | 110 | 2470 | A | 13 |
| Example 13 | 100 | 88 | 213 | 119 | 2700 | A | 28 |
| Example 14 | 100 | 90 | 155 | 112 | 2590 | A | 36 |
| Example 15 | 100 | 109 | 182 | 145 | 2980 | A | 19 |
| Comparative Example 1 | 100 | 39 | ≧350 | ≦35 | 1350 | B | 75 |
| Comparative Example 2 | 100 | 112 | 148 | 164 | 3320 | B | 66 |
| Comparative Example 3 | 100 | 39 | ≧350 | ≦35 | 1350 | A | 25 |
| Comparative Example 4 | unable to form a film due to roll deformation | | | | | | |
| Comparative Example 11 | 100 | 80 | 20 | 80 | 1820 | A | 48 |

(Film Surface)
A: mirror-finished on both sides,
B: mirror-finished on one side

Table 1 confirms that the film of Example 1 of the invention has a high yield stress and a high elongation at break, and is properties as compared with the biaxially-stretched PET film and the A-PET film produced according to conventional production methods, that the former is excellent in formability, and that since the former is mirror-finished on both sides thereof and has good adhesiveness to metal plates.

In Examples 2 to 7, the touch pressure was changed within the scope of the invention. When the touch pressure increased, yield stress, stress at break and tensile modulus increased and elongation at break decreased. In Examples 8 to 10, the temperature of the resin composition just before fed to the nip-pressing unit was changed within the scope of the invention. When the temperature of the resin composition just before fed to the nip-pressing unit increased, elongation at break increases and stress at break and tensile modulus decreased. In Examples 11 to 14, the peripheral speed ratio was changed within the scope of the invention. When the peripheral speed ratio decreased, elongation at break decreased and Ra increased. In Example 15, PEN was used as a crystalline thermoplastic resin. It was found that tendency of properties of Example 15 differs from that of Example 1 using PET. The films of Examples 2 to 15 had a low orientation degree on their surface and a high orientation degree in their inside. These films had a thickness fluctuation of not more than 3%.

In Comparative Example 3, the film produced under a touch pressure that is lower than the claimed range had a low yield stress. In Comparative Example 4, a touch pressure that is higher than the claimed range was applied but a film formation was not possible due to deformation of the roll. In Comparative Example 5, the temperature of the composition just before fed to the nip-pressing unit was Tc. The produced film had a low elongation at break.

In addition, it is known that, according to the production method of the invention, a readily-formable PET film can be produced not requiring use of any special resin and not requiring a longitudinal stretching step and a lateral stretching step. No one has heretofore known at all that, according to the production method of Example 1 of the invention, a high-strength film of good formability can be produced, and this is a surprising finding. Specifically, it is known that, according to the production method of the invention, a readily-formable, double-mirror-finished PET film excellent in formability can be produced with good producibility and at low cost like in a case of producing ordinary unstretched PET films.

When a film was produced in the same manner as in Example 1, for which, however, the peripheral speed ratio of the two rolls was changed to 1.00, a film having a similar mechanical property to the film of Example 1 was obtained.

Examples 21 to 27

Production of Laterally-Stretched Film

Unstretched films were produced in the same manner as in Example 1, for which, however, the resin sued and the condition in film formation were changed to those in Table 2 below. Next, the unstretched film was stretched in the width direction thereof at the draw ratio and at the temperature as in Table 2 below (lateral stretching). The laterally-stretched films are films of Examples 21 to 27.

In Example 27, the PEN resin in Production Example 2 was used as the resin material. The crystallization temperature of the resin was 230° C., and the glass transition point thereof was 120° C.

Comparative Example 11

A film of Comparative Example 11 was produced in the same manner as in Example 21, for which, however, the condition in film formation was changed as in Table 2 below and a touch roll was not used.
(Tensile Modulus)
The tensile modulus of the films of Examples and Comparative Examples was measured, and the data are shown in Table 2.
(Polarization Property)
The films of Examples and Comparative Examples were analyzed for the polarization property thereof, and the results are shown in Table 2.
⊚: The film had an extremely good polarization property.
○: The film had a good polarization property.
Δ: The film had a polarization property.
x: The film did not have a polarization property.
(Film Surface Condition)
The films of Examples and Comparative Examples were analyzed for the surface condition thereof, and the results are shown in Table 2.

TABLE 2

|  | Material | Touch Pressure (MPa) | Peripheral Speed Ratio | Thickness (μm) | Tensile Modulus (MPa) | Lateral Stretching temperature | Lateral Stretching draw ratio | Polarization Property | Film Surface |
|---|---|---|---|---|---|---|---|---|---|
| Example 21 | PET | 10 | 1.000 | 100 | 4100 | room temperature | 2 | Δ | mirror-finished on both sides |
| Example 22 | PET | 60 | 1.000 | 100 | 5200 | room temperature | 2 | Δ | mirror-finished on both sides |
| Example 23 | PET | 130 | 1.000 | 100 | 6000 | room temperature | 2 | Δ | mirror-finished on both sides |
| Example 24 | PET | 60 | 0.990 | 80 | 5800 | Tg | 1.5 | ○ | mirror-finished on both sides |
| Example 25 | PET | 60 | 0.900 | 80 | 6500 | Tg | 1.5 | ⊚ | mirror-finished on both sides |
| Example 26 | PET | 60 | 0.750 | 80 | 7000 | Tg | 1.5 | ⊚ | mirror-finished on both sides |
| Example 27 | PEN | 60 | 0.900 | 60 | 6000 | room temperature | 2 | ⊚ | mirror-finished on both sides |
| Comparative Example 11 | PET | no touch roll | | 100 | 2120 | room temperature | 2 | X | mirror-finished on both sides |

Table 2 confirms that the films of Examples 21 to 27 were all mirror-finished on both sides thereof, and all had good physical properties. In particular, it is known that, in these Examples, high-strength readily-formable films were produced, not requiring a longitudinal stretching step; and this could not been anticipated from prior art knowledge. On the other hand, in Comparative Example 11, the film was produced not using a touch roll; however, the film had a low tensile modulus, and it was mirror-finished only on one side thereof. From the above, it is known that, according to the production method of the invention, films excellent in formability and having mirror-finished surfaces on both sides thereof can be produced.

In addition, it is further known that the films could have a polarization property after processed in the lateral stretching step as in Examples 21 to 27; however, even after the lateral stretching step, the film in Comparative Example 11 could not almost have a polarization property. It is also known that, in Examples 21 to 27 where the rolls were driven at a different peripheral speed, the films produced could have a polarization property.

It was observed that the films of Examples 21 to 27 haD a high orientation degree in their inside and a thickness fluctuation of 0.5 to 2%. It was also observed that the film of Example 1 had a surface roughness degree (Ra) of less than 15 nm on both sides, the films of Examples 21 to 27 had a surface roughness degree (Ra) of less than 30 nm on both sides, and these films have mirror surfaces on both sides thereof.

The invention claimed is:

1. A method for producing an optical film having a mirror-finish surface on both sides thereof, said method comprising:
   continuously melt-extruding from an extrusion die a crystalline polyester resin composition at a temperature higher than the crystallization temperature of the resin to a nip formed between first and second metal nip-pressing rolls;
   continuously forming the composition into a film by applying pressure between 30 and 1000 MPa to the composition by the rotating rolls while leading the composition to pass through said nip; and
   stretching the film in the width direction thereof,
   wherein the first and second rolls have a temperature lower than the crystallization temperature of the crystalline resin, and
   wherein the rotating speed ratio of the second roll with respect to the first roll is from 0.75 to 0.98.

2. The method according to claim 1, wherein an air gap from the die to the nip is between 10 and 300 mm.

3. The method according to claim 2, wherein an air gap from the die to the nip is between 30 and 200 mm.

4. The method according to claim 1, wherein the film is formed at a speed not lower than 2 m/min.

5. The method according to claim 4, wherein the film is formed at a speed not lower than 10 m/min.

6. The method according to claim 1, wherein the melt width is between 200 and 2000 mm.

7. The method according to claim 1, wherein the surface of the first and second rolls has an arithmetic mean height of at most 100 nm.

8. The method according to claim 7, wherein the surface of the first and second rolls has an arithmetic mean height of at most 25 nm.

9. The method according to claim 1, wherein the Shore hardness of the first and second rolls is at least 45 HS.

10. The method according to claim 9, wherein the Shore hardness of the first and second rolls is between 60 and 90 HS.

11. The method according to claim 1, wherein the first and second rolls have a diameter of between 200 and 1500 mm.

12. The method according to claim 11, wherein the first and second rolls have a diameter of between 300 and 1000 mm.

13. The method according to claim 12, wherein the first and second rolls have a diameter of between 350 and 500 mm.

14. The method according to claim 1, wherein a shielding member having a heat-insulating function or a heat-reflecting function is disposed in at least a part of the melt path to the nip.

15. The method according to claim 14, wherein a temperature fluctuation of the film in the width direction thereof is within ±3° C.

16. The method according to claim 15, wherein a temperature fluctuation of the film in the width direction thereof is within ±1° C.

17. The method according to claim 1, wherein the film is pre-heated prior to stretching.

18. The method according to claim 1, wherein the stretched film has a polarization property.

* * * * *